(12) United States Patent  
Rosa et al.

(10) Patent No.: US 12,379,743 B1  
(45) Date of Patent: Aug. 5, 2025

(54) WEARABLE SMART RING SYSTEM AND METHOD

(71) Applicant: Oasis Devices, Inc., Weston, FL (US)

(72) Inventors: Ricardo Rosa, Weston, FL (US); Mahmoud Sharkatly, Abu Dhabi (AE)

(73) Assignee: Oasis Devices, Inc., Weston, FL (US)

( * ) Notice: Subject to any disclaimer, the term of this patent is extended or adjusted under 35 U.S.C. 154(b) by 0 days.

(21) Appl. No.: 19/033,202

(22) Filed: Jan. 21, 2025

Related U.S. Application Data

(63) Continuation of application No. 18/803,302, filed on Aug. 13, 2024, now Pat. No. 12,235,680.

(60) Provisional application No. 63/573,371, filed on Apr. 2, 2024.

(51) Int. Cl.
| | |
|---|---|
| *G06F 1/16* | (2006.01) |
| *G06F 3/01* | (2006.01) |
| *G06F 3/042* | (2006.01) |
| *G06F 3/044* | (2006.01) |

(52) U.S. Cl.
CPC .............. *G06F 1/163* (2013.01); *G06F 3/016* (2013.01); *G06F 3/017* (2013.01); *G06F 3/042* (2013.01); *G06F 3/044* (2013.01)

(58) Field of Classification Search
CPC .......... G06F 1/163; G06F 3/016; G06F 3/017; G06F 3/042; G06F 3/044
See application file for complete search history.

(56) References Cited

U.S. PATENT DOCUMENTS

| | | |
|---|---|---|
| 6,549,791 B1 | 4/2003 | Jeon et al. |
| 6,619,836 B1 | 9/2003 | Silvant et al. |
| 9,830,783 B1 | 11/2017 | Kessler et al. |
| 9,841,781 B2 | 12/2017 | Wang et al. |
| 10,842,429 B2 | 11/2020 | Kinnunen et al. |
| 10,893,833 B2 | 1/2021 | Haverinen et al. |
| 11,599,147 B2 | 3/2023 | Von Badinski et al. |

(Continued)

FOREIGN PATENT DOCUMENTS

| | | |
|---|---|---|
| WO | 2021/061275 A1 | 4/2021 |
| WO | 2021/181280 A1 | 9/2021 |

OTHER PUBLICATIONS

International Search Report and Written Opinion in PCT/US2025/020496, mailed Apr. 15, 2025, 7 pages.

*Primary Examiner* — Adrian S Wilson  
(74) *Attorney, Agent, or Firm* — Orrick, Herrington & Sutcliffe LLP

(57) ABSTRACT

A smart ring system for changing applications and methods for making and using the same. The smart ring system comprises a wearable smart ring equipped with input mechanisms for user interaction, wireless communication devices for interfacing with a variety of electronic devices and/or a power management system for efficient energy use. The smart ring system advantageously can allow users to seamlessly switch between and control applications on connected devices, such as smartphones, cameras, televisions, smart home devices, mixed-reality devices, via a combination of rotational motion gestures, optical and capacitive based touch inputs, haptic feedback and color indications on the smart ring system. The smart ring system advantageously can be manufactured with one or more flexible printed circuit boards that can be encased via an over molding process, which allows for thinner and more compact device profile for improved wearability.

21 Claims, 15 Drawing Sheets

(56) References Cited

U.S. PATENT DOCUMENTS

| | | | |
|---|---|---|---|
| 11,868,178 | B2 | 1/2024 | Von Badinski et al. |
| 12,235,680 | B1* | 2/2025 | Rosa .................. G06F 3/03547 |
| 2001/0043514 | A1 | 11/2001 | Kita |
| 2007/0279852 | A1 | 12/2007 | Daniel et al. |
| 2011/0007468 | A1 | 1/2011 | Burton et al. |
| 2014/0078694 | A1 | 3/2014 | Wissmar |
| 2014/0337621 | A1 | 11/2014 | Nakhimov |
| 2015/0062086 | A1* | 3/2015 | Nattukallingal ........ G06F 3/016 |
| | | | 345/175 |
| 2015/0065090 | A1 | 3/2015 | Yeh |
| 2015/0220109 | A1* | 8/2015 | von Badinski ........ G06V 40/70 |
| | | | 368/10 |
| 2016/0078061 | A1 | 3/2016 | Hilsdale et al. |
| 2016/0252115 | A1 | 9/2016 | Wang et al. |
| 2016/0283014 | A1 | 9/2016 | Rider et al. |
| 2016/0306421 | A1 | 10/2016 | Piccinini et al. |
| 2017/0150616 | A1 | 5/2017 | Li et al. |
| 2017/0235933 | A1* | 8/2017 | von Badinski ........... H02J 7/35 |
| | | | 726/19 |
| 2019/0187750 | A1 | 6/2019 | Griffin |
| 2019/0332144 | A1 | 10/2019 | Tian |
| 2019/0384354 | A1* | 12/2019 | von Badinski .... A61B 5/02416 |
| 2020/0241641 | A1 | 7/2020 | Vescovi et al. |
| 2020/0401183 | A1* | 12/2020 | von Badinski ........ A61B 5/681 |
| 2021/0286433 | A1 | 9/2021 | Nickerson |
| 2022/0057832 | A1* | 2/2022 | von Badinski ....... H02J 7/0044 |
| 2023/0213970 | A1* | 7/2023 | von Badinski .... G02B 19/0061 |
| | | | 726/19 |
| 2023/0376071 | A1* | 11/2023 | von Badinski .... G02B 19/0052 |
| 2023/0393635 | A1 | 12/2023 | Hiemstra et al. |

* cited by examiner

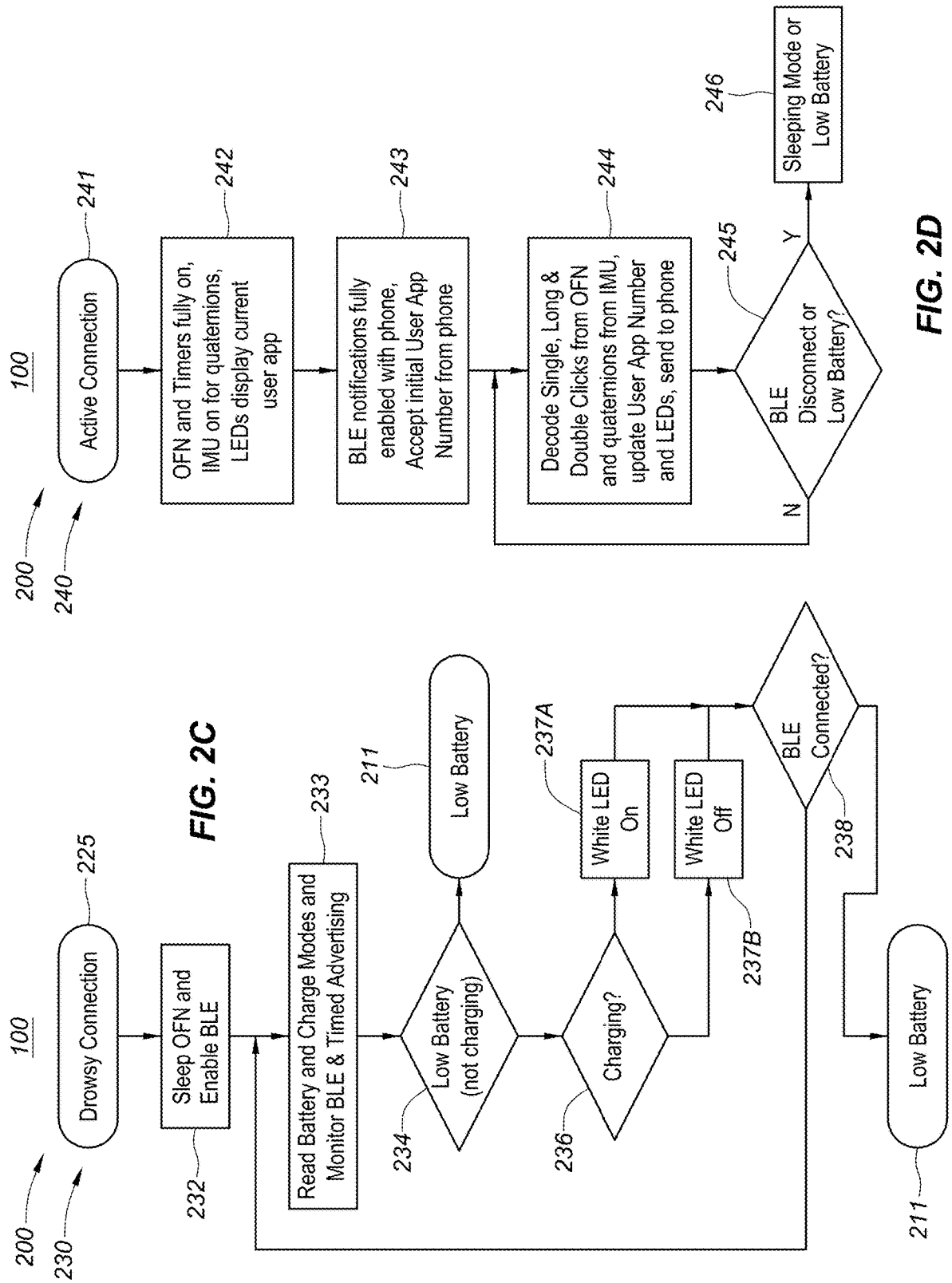

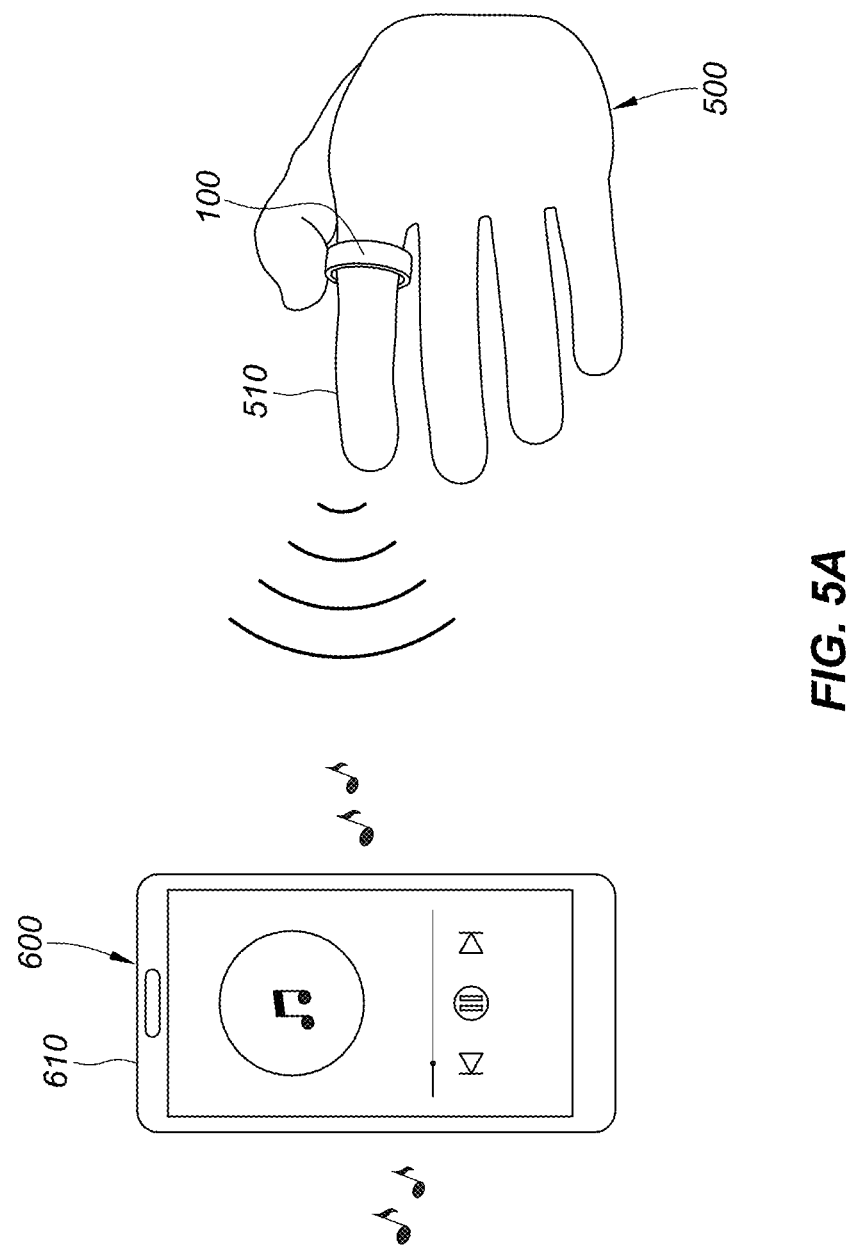

flex PCB uncurved and with no over-molded supports

WEARABLE SMART RING SYSTEM AND METHOD

CROSS-REFERENCE TO RELATED APPLICATIONS

This application is a continuation of co-pending U.S. patent application Ser. No. 18/803,302, filed on Aug. 13, 2024, which claims the benefit of, and priority to, U.S. Provisional Application Ser. No. 63/573,371, filed on Apr. 2, 2024, the disclosures of which are hereby incorporated herein by reference in their entireties and for all purposes.

FIELD

The present disclosure generally relates to wearable electronic devices and more particularly, but not exclusively, to wearable smart rings for enabling users to wirelessly interface with a wide variety of connected devices.

BACKGROUND

Currently-available ring devices utilize internal microphones with voice recognition technology for changing device modality and executing other functions through spoken instructions. Voice commands, however, are not always practical in noisy environments or in contexts where privacy or quiet is required. Some conventional ring devices thus incorporate physical buttons or other touch systems that can be programmed to switch applications or perform specific tasks. These physical buttons, however, add to the hardware complexity and can limit design manufacturability and comfort. Furthermore, physical buttons inherently require dedicated hardware for the purpose of changing applications. A selected button or other touch system, when operated alone, can be used to either control a connected device, or change what connected device to control, but not both.

In addition, due to limited surface area of conventional smart ring devices, capacitive touch systems on conventional smart ring devices do not have enough resolution to enable two-dimensional trackpad-like features for swiping and sliding in two dimensions. Attempts to address this shortcoming have included utilizing optical touch systems. The optical touch systems, however, introduced new issues such as a lack of false positive touch preventions since the optical touch systems are triggered by materials, like fabric and cloth, that do not hold electrical charges. These false positives introduce user experience problems when the user wears the ring with gloves or puts their hands in pockets since unintended touches, swipes, and slides are triggered.

Conventional ring devices contain traditional rigid-flex printed circuit boards (or PCBs). During manufacturing, the printed circuit boards are flexed to curve printed circuits around a circumference of the ring device while maintaining structural integrity under the rigid sections to prevent solder points from being compromised by the pressure of final over molding processes. Traditional rigid-flex PCBs, however, require a minimum length of five millimeters for the flex sections, which significantly limits the number of electronic components that can be fitted. Integrated circuits cannot be placed on curved sections of a rigid-flex PCB, and fitting additional components only on the flat sections of the rigid-flex PCB significantly increases the thickness and size of the conventional ring devices.

In view of the foregoing, a need exists for an improved wearable smart ring system and method that overcomes the aforementioned obstacles and deficiencies of currently-available ring devices.

BRIEF DESCRIPTION OF THE FIGURES

FIG. 2C is a top-level flow chart illustrating another alternative exemplary embodiment of smart ring system operations, wherein the smart ring system is operating in a drowsy mode.

FIG. 2D is a top-level flow chart illustrating yet another alternative exemplary embodiment of smart ring system operations, wherein the smart ring system is operating with an active connection with a selected connected device.

FIG. 5A is a detail drawing illustrating an exemplary embodiment of the smart ring system of FIG. 1, wherein the smart ring system is configured interacted with a smart telephone device.

Figure 1:
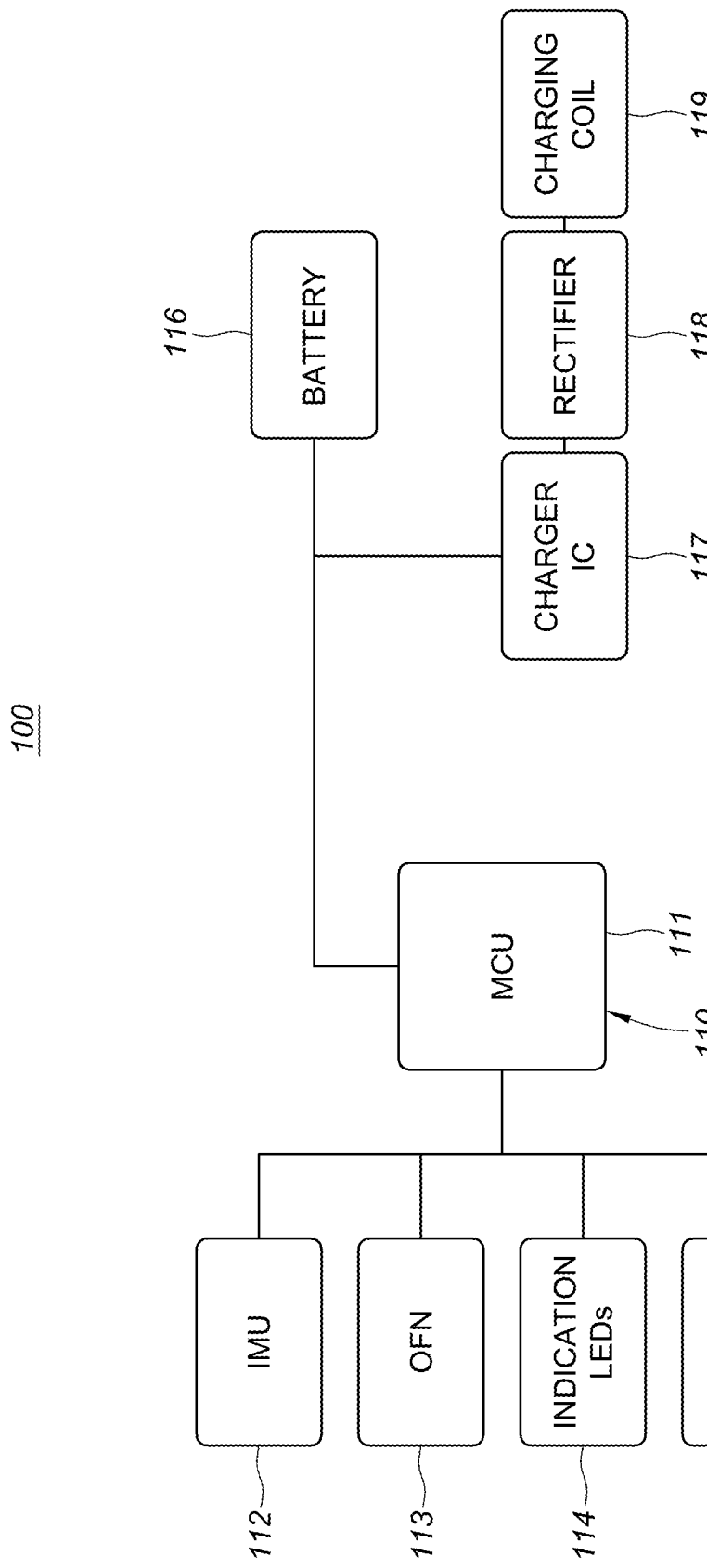
FIG. 1 is a top-level block diagram illustrating an exemplary embodiment of a smart ring system.

It should be noted that the figures are not drawn to scale and that elements of similar structures or functions may be generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available ring devices utilize complex hardware, are difficult to manufacture, are uncomfortable and are not practical in noisy environments or where privacy or quiet is required, a wearable smart ring system and method that overcomes these shortcomings can prove desirable and provide a basis for a wide range of applications. This result can be achieved, according to selected embodiments disclosed herein, by a smart ring system 100 as illustrated in FIG. 1. The smart ring system 100 can comprise a smart wearable device that can be worn by a user 500 (shown in FIG. 3). In other words, the smart ring system 100 can be worn on a body of the user 500. The smart ring system 100, for example, can be configured to be disposed on an index finger 511 (shown in FIG. 3) or other finger (or thumb) 510 (shown in FIG. 3) of the user 500.

Turning to FIG. 1, the smart ring system 100 is shown as comprising a plurality of interconnected electrical components 110. The electrical components 110 of FIG. 1 advantageously are arranged to reflect a functional hierarchy of the smart ring system 100.

As shown in FIG. 1, the electrical components 110 can include a main control unit (or MCU) 111 that can comprise a central processor for orchestrating operations of the smart ring system 100. The main control unit 111 can be configured to interface with an inertial measurement unit (or IMU) 112 for motion detection and/or an optical finger navigation (or OFN) device 113 for navigation. The inertial measurement unit 112, for example, can include an accelerometer, a gyroscope and/or a magnetometer, without limitation. In selected embodiments, user feedback can be provided by the main control unit 111 via one or more indication light emitting diodes (or LEDs) 114 and/or a haptic motor system 115. Additionally and/or alternatively, power management for the smart ring system can be controlled via a battery 116, a charger integrated circuit 117, a rectifier circuit 118 and/or and an energy storing and/or transmitting device, such as a charging coil 119, that can be configured for wireless energy transfer.

The smart ring system 100 advantageously can overcome the challenge of changing applications or connected devices 600 (shown in FIGS. 5A-B) to be controlled from a conventional electronic device controller, which lacks traditional touch screens or physical buttons because of their unavailability, impracticality or inconvenience. Limited physical space in addition to curved surface requirements in wearable devices, preclude conventional ring devices from utilizing traditional touch screens. Accordingly, the smart ring system 100 advantageously can combine rotational motion gestures, optical and capacitive based touch inputs, haptic feedback and/or color indications for changing applications and/or connected devices 600.

Figures 2A, 2B:
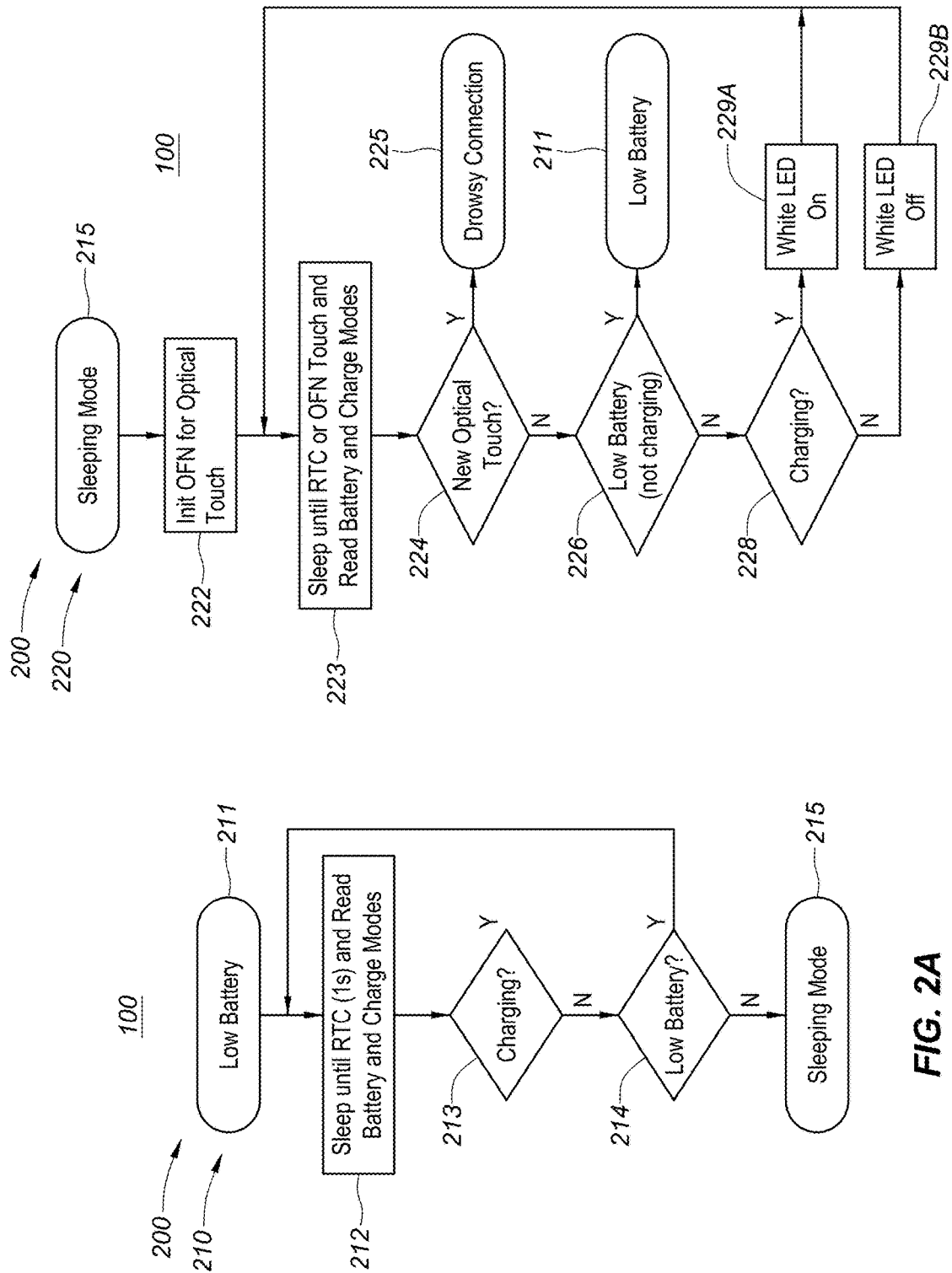
FIG. 2A is a top-level flow chart illustrating an exemplary embodiment of smart ring system operations, wherein the smart ring system is operating in an ultra-low power mode with a low battery level.
FIG. 2B is a top-level flow chart illustrating an alternative exemplary embodiment of smart ring system operations, wherein the smart ring system is operating in a low power mode with a good battery level.

Turning to FIGS. 2A-D, the smart ring system 100 can support a plurality of smart ring system operations. Various methods 200 for operating the smart ring system 100 are illustrated. The smart ring system 100 of FIG. 2A, for example, is shown as operating in an ultra-low power (or deep sleep) mode with a low battery level. In selected embodiments, the smart ring system 100 can be reset while in the ultra-low power mode. Turning to FIG. 2A, an exemplary method 210 for operating the smart ring system 100 in the ultra-low power mode with the low battery level is shown.

A low battery condition 211 of the smart ring system 100 can be detected. In the low battery condition, the smart ring system 100 can be disposed in the ultra-low power mode. Bluetooth Low Energy (or BLE) is kept dormant, the IMU 112 (shown in FIG. 1) and the OFN 113 (shown in FIG. 1) remain in a sleep (or sleeping) mode, and the LEDs 114 (shown in FIG. 1) and the haptic motor system 115 (shown in FIG. 1) remain off in the ultra-low power mode. The ultra-low power mode is executed at least once after a reset. A user of the smart ring system 100 preferably will not realize that the smart ring system 100 is in ultra-low power mode unless the battery 116 is low.

The smart ring system 100 can remain in the ultra-low power mode until a real time clock (or RTC) signal is received, at 212. The RTC signal can be used to wake the smart ring system 100 from the ultra-low power mode and to initiate a read of the current battery level of the battery 116 (shown in FIG. 1). The current battery level can be read, at 212, and the smart ring system 100 can determine whether a battery charging system (not shown) is connected, at 213. If the battery charging system is not detected, at 213, and battery is determined to be below acceptable level, at 214, the smart ring system 100 can remain in the low battery condition 211, and the current battery level can again be read, at 212. If battery level is acceptable, the smart ring system 100 can enter into sleep mode 215.

The smart ring system 100 is shown in FIG. 2B as operating in the sleep mode. The sleep mode, in selected embodiment, can be a low power mode with the battery 116 (shown in FIG. 1) being charged. Turning to FIG. 2B, an exemplary method 220 for operating the smart ring system 100 in the sleep mode 215 is shown. At 222, the OFN 113 (shown in FIG. 1) can be initialized for sensing a touch by a user (not shown). The smart ring system 100 can remain in the sleep mode until a user touch is sensed by the OFN 113 and/or a real time clock (or RTC) signal is received, at 223. The user touch and/or the RTC signal can be used to wake the smart ring system 100 from the sleep mode and to initiate detection of whether the battery charging system is present and/or a current battery level of the battery 116.

The method 220 can include a determination of whether a user touch has been sensed by the OFN 113, at 224. If the OFN 113 senses a user touch, the smart ring system 100 can enter a drowsy mode 225; otherwise, the current battery level can be read, at 226. The smart ring system 100 can enter (or remain in) the low battery mode 211 if the current battery level read, at 226, indicates that the battery 116 has an insufficient battery level. If the battery level read, at 226, indicates that the level of the battery 116 is not low, a determination can be made whether a battery charging system (not shown) is connected, at 228.

As shown in FIG. 2B, if the battery charging system is determined to be connected, at 228, a selected indication light emitting diode 114 (shown in FIG. 1) can be activated, at 229A, and the smart ring system 100 can remain in the sleep mode and await receipt of another user touch and/or RTC signal. The selected indication light emitting diode 114 alternatively can be (or remain) deactivated, at 229B, and the smart ring system 100 can remain in the sleep mode and await receipt of another user touch and/or RTC signal if the battery charge level read, at 228, indicates that the battery 116 is not still charging. When the smart ring system 100 is in the sleep mode, Deep Sleep advantageously can be utilized for conserving power with Multi-Count WatchDog Timer (or MCWDT), OFN 113 and/or BLE each being Deep Sleep tolerant. In the sleep mode, the smart ring system 110 can exit to low battery mode if the battery 116 is not charging.

The smart ring system 100 is shown in FIG. 2C as operating in the drowsy connection (or mode). The drowsy mode, in selected embodiment, can be another low power mode during which the battery 116 (shown in FIG. 1) can be charged. Turning to FIG. 2C, an exemplary method 230 for operating the smart ring system 100 in the drowsy mode 225 is shown. In the drowsy mode, the BLE can be set to active, and any BLE advertisements can be activated full and/or part time. Charge mode and low battery can be monitored. The smart ring system 100 while in the drowsy mode basically can wait for a BLE connection and/or can time out to the sleep mode or the low battery mode if the battery 116 is not charging.

At 232, the OFN 113 (shown in FIG. 1) can be disposed in a sleep mode, and/or BLE can be enabled. The smart ring system 100, at 233, can perform a read of the current battery level of the battery 116. Additionally and/or alternatively, the smart ring system 100 can monitor the BLE and/or timed BLE advertisements, at 233. The current battery level can be read, at 234. The smart ring system 100 can enter (or remain in) the low battery mode 211 if the current battery level read, at 234, indicates that the battery 116 has an insufficient battery level. If the battery level read, at 234, indicates that the level of the battery 116 is not low, a determination is made of whether a battery charging system (not shown) is connected, at 236.

As shown in FIG. 2C, if the battery charging system is determined to be connected, at 236, a selected indication light emitting diode 114 (shown in FIG. 1) can be activated, at 237A. The selected indication light emitting diode 114 alternatively can be (or remain) deactivated, at 237B, if the battery charge level read, at 236, indicates that the battery 116 is not still charging. The smart ring system 100 can determine whether BLE is connected, at 238.

Depending upon the determination whether BLE is connected, at 238, the smart ring system 100 alternatively can return to the low battery mode 211 or can perform another read of the current battery level of the battery 116 and can monitor the BLE and/or timed BLE advertisements, at 233.

Figure 5B:
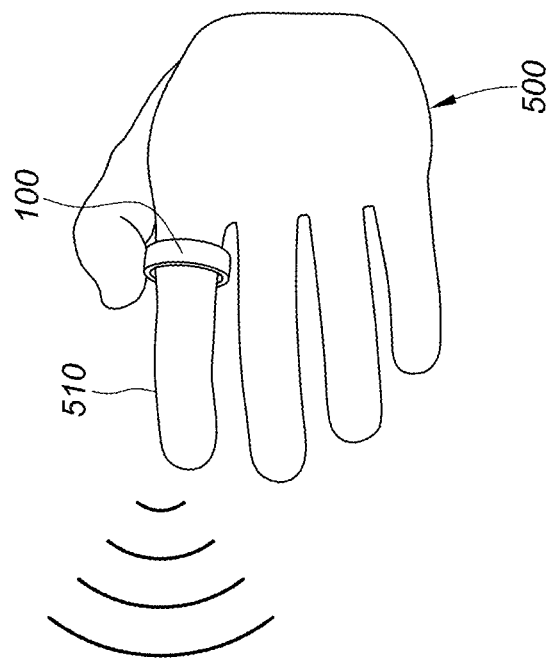
FIG. 5B is a detail drawing illustrating an alternative exemplary embodiment of the smart ring system of FIG. 1, wherein the smart ring system is configured interacted with a smart television.
Figure 5B:
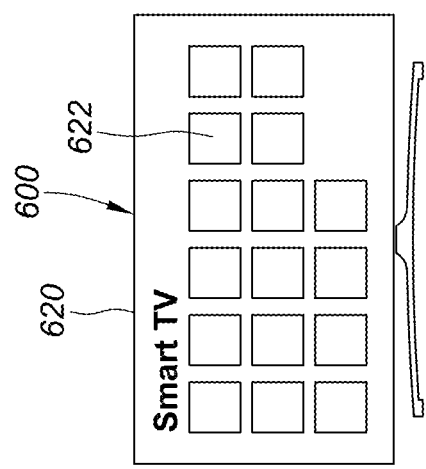

The smart ring system 100 is shown in FIG. 2D as operating with an active connection (or mode) for enabling a user to utilize the smart ring system 100 for interacting with a smart telephone device 610 (shown in FIG. 5A), a smart television 620 (shown in FIG. 5B) and/or any other type of connected device(s) 600 (shown in FIGS. 5A-B). In selected embodiment, the smart ring system 100 can interact with the connected device(s) 600 via one or more other electrical components 110 (shown in FIG. 1) of the smart ring system 100 being active and with additional BLE and MCU activity. Additional indication light emitting diodes 114 (shown in FIG. 1), for example, can utilized to indicate the interactions with the connected device(s) 600.

Turning to FIG. 2D, an exemplary method 240 for operating the smart ring system 100 in the active connection mode, at 241, is shown. In the active connection mode, the IMU 112 (shown in FIG. 1), OFN 113 (shown in FIG. 1), indication light emitting diode(s) 114 (shown in FIG. 1) and timers can be activated, at 242. The IMU 112, for example, can be on for quaternions. Additionally and/or alternatively, one or more indication light emitting diodes 114 can display a current user app. At 243, BLE notifications can be enabled with the connected device(s) 600 (shown in FIGS. 5A-B) and/or an initial user app number can be received from the connected device(s) 600.

The smart ring system 100 can decode single, long and/or double clicks or other user input received by the OFN 113 and/or the quaternions from the IMU 112, at 244. Additionally and/or alternatively, the smart ring system 100 can decode swipes in two dimensions. In selected embodiments, the smart ring system 100 can update the user app number and the indication light emitting diode(s) 114 based, for example, upon the received user input and/or quaternions and can send the updated user app number to the connected device(s) 600, at 244. At 245, the smart ring system 100 can determine whether the BLE is disconnected and/or whether the battery 116 (shown in FIG. 1) has insufficient battery level. If the BLE is disconnected and/or the battery 116 has insufficient battery level, the smart ring system 100, at 246, can enter the sleep mode or other low battery state. Otherwise, the smart ring system 100 can decode additional user input received by the OFN 113 and/or quaternions from the IMU 112 and can update the user app number and the indication light emitting diode(s) 114, at 244.

Figure 3:
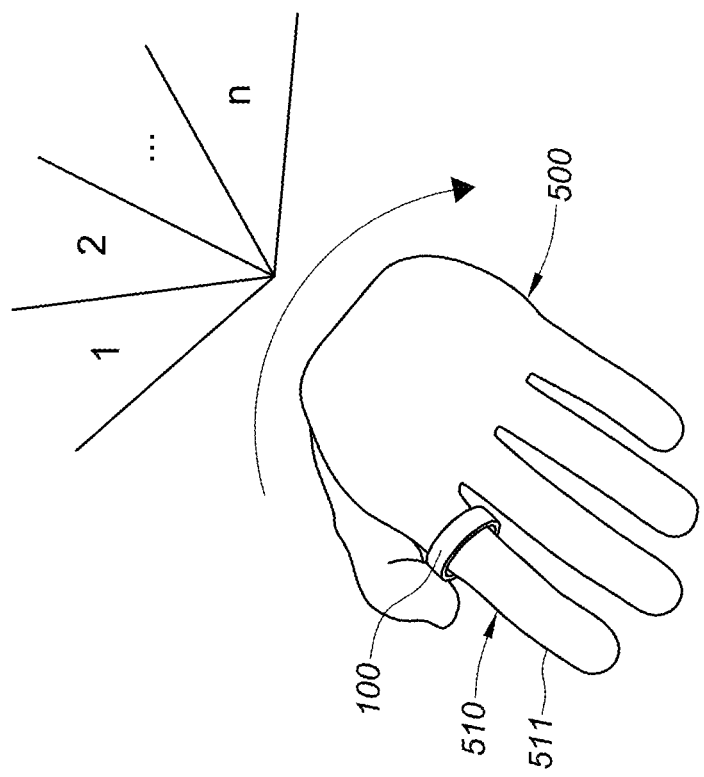
FIG. 3 is a detail drawing illustrating an exemplary embodiment of the smart ring system of FIG. 1, wherein the smart ring system is configured to switch between a first application and a second application associated with the selected connected device based upon rotational motion of a user hand.

Turning to FIG. 3, the smart ring system 100 is shown as being disposed on an index finger 511 of the user 500. In selected embodiments, the smart ring system 100 can be configured to switch among the applications via one or more selected motions of the hand of the user 500. The smart ring system 100 can be configured to switch among a predetermined number n of applications that are associated with selected connected device(s) 600 (shown in FIGS. 5A-B). The smart ring system 100 can detect the motion of the hand of the user 500 via the IMU 112 (shown in FIG. 1), the OFN 113 (shown in FIG. 1) and/or other optical and/or capacitive touch sensor(s) of the smart ring system 100.

In selected embodiments, the smart ring system 100 can be configured to switch among the applications via rotational motion of the hand of the user 500 as shown in FIG. 3. The smart ring system 100, in other words, can activate and navigate through the applications via a rotational motion gesture. As illustrated in FIG. 3, the rotational path of the hand of the user 500 can be divided into n sections (or sectors) with each sector corresponding to a different application. The user 500 thereby can navigate through the applications via a rotation of the hand of the user and can select or otherwise activate a selected application by disposing the hand into the predetermined sector associated with the selected application.

Figure 4:
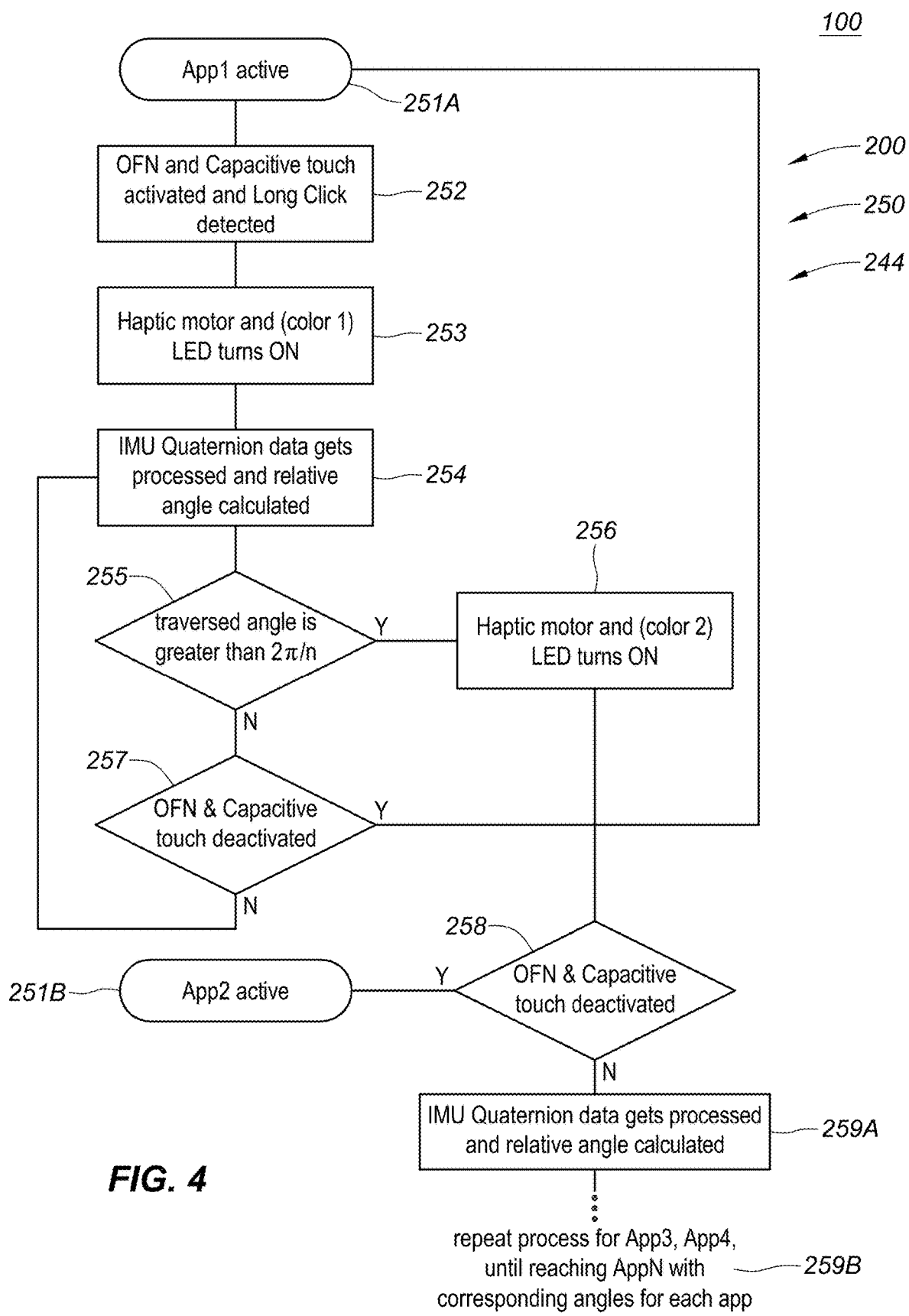
FIG. 4 is a top-level flow chart illustrating an exemplary embodiment of a method by which the smart ring system of FIG. 3 switches between the first application and the second application associated with the selected connected device based upon the rotational motion of the user hand.

An exemplary method 250 by which the smart ring system 100 can switch between a first application and a second application associated with the selected connected device(s) 600 (shown in FIGS. 5A-B) is illustrated in FIG. 4. The smart ring system 100 can switch between the first application and the second application, for example, by decoding user input received by the OFN 113 (shown in FIG. 1) and/or the quaternions from the IMU 112 (shown in FIG. 1) and/or updating the user app number and/or the indication light emitting diode(s) 114 (shown in FIG. 1) in the manner discussed with reference to the method 240, at 244, as shown in FIG. 2D.

Turning to FIG. 4, the first application App1 associated with the selected connected device(s) 600 is shown as being active, at 251A. The IMU 112, the OFN 113 and/or other optical and/or capacitive touch sensor(s) of the smart ring system 100 can be activated, at 252. A long click and/or other user input can be detected via the activated OFN 113 and/or capacitive touch sensor(s), and the smart ring system 100 can enter an application selection mode. The OFN 113 and/or capacitive touch sensor(s) optionally can be deactivated after the user input is registered. At 253, the haptic motor system 115 (shown in FIG. 1) and/or a first indication light emitting diode 114 (shown in FIG. 1) can be activated. The activated first indication light emitting diode 114 preferably is illuminated with a predetermined color that is associated with the first application App1. The haptic motor system 115 can provide a distinct haptic feedback, and/or the quaternion orientation data can be processed to calculate the relative angle of motion of the smart ring system 100, at 254. The user 500 (shown in FIG. 3) thereby can navigate through the applications available from the selected connected device(s) 600 via a rotation of the hand of the user 500 as illustrated in FIG. 3 and can select or otherwise activate the first application App1 by disposing the hand into the predetermined sector associated with the first application App1.

The IMU 112, the OFN 113 and/or other optical and/or capacitive touch sensor(s) of the smart ring system 100 can measure a rotational orientation of the hand of the user 500. In selected embodiments, one or more sensor fusion processes can combine rotational orientation data provided by the IMU 112, the OFN 113 and/or other optical and/or capacitive touch sensor(s). The smart ring system 100 can calculate the orientation position using quaternions and subsequently the traversed angle of the user hand using the resulting quaternions. The traversed angle can be matched with the corresponding application of the selected connected device(s) 600, updating a color of the indication light emitting diode 114 and providing a distinct haptic feedback to indicate the first application App1 has been selected.

As the hand of the user 500 continues to rotate, the smart ring system 100 can determine whether the traversed angle of rotation is greater than 1/nth of a full rotation of the hand of the user 500, at 255, where n comprises the predetermined number of applications associated with the selected connected device(s) 600. A full rotation of the hand of the user 500 can comprise three hundred and sixty degrees or two pi radians. If the traversed angle of rotation is less than or equal to 1/nth of a full rotation of the hand of the user 500, the smart ring system 100 can determine whether the IMU 112, the OFN 113 and/or other optical and/or capacitive touch sensor(s) of the smart ring system 100 have been deactivated, at 257. If the IMU 112 and/or other optical and/or capacitive touch sensor(s) of the smart ring system 100 have been deactivated, the first application App1 can remain active, at 251A; otherwise, the haptic motor system 115 can provide a distinct haptic feedback and/or the quaternion orientation data can be processed to calculate the relative angle of motion of the smart ring system 100, at 254.

If the traversed angle of rotation is greater than 1/nth of a full rotation of the hand of the user 500, the haptic motor system 115 can be activated, and a second indication light emitting diode 114 (shown in FIG. 1) associated with a second application App2 can be illuminated, at 256. The second indication light emitting diode 114, in selected embodiments, can illuminate with a second indication light color that is different from a first indication light color of the first indication light emitting diode 114. The smart ring system 100 can determine whether the IMU 112, the OFN 113 and/or other optical and/or capacitive touch sensor(s) of the smart ring system 100 have been deactivated, at 258. If the IMU 112 and/or other optical and/or capacitive touch sensor(s) of the smart ring system 100 have been deactivated, the second application App2 can become active, at 251B; otherwise, the haptic motor system 115 can provide a distinct haptic feedback and/or the quaternion orientation data can be processed to calculate the relative angle of motion of the smart ring system 100, at 259A. The method 250 can continue, at 259B, until an appropriate application associated with the selected connected device(s) 600 has been selected and activated. In selected embodiments, the application selection process is deemed to be complete and the selected application is deemed to be active after the IMU 112, the OFN 113 and/or other optical and/or capacitive touch sensor(s) are disengaged.

Stated somewhat differently, the exemplary application selection method 250 utilized by the smart ring system 100, can focus on a rotational gesture-based interface. The smart ring system 100 can be equipped with one or more optical sensors, capacitive touch sensors and/or inertial measurement devices. The smart ring system 100 can interpret rotational motion gestures to switch between different applications or functionalities associated with the selected connected device(s) 600 while the optical and capacitive touch sensors are engaged. Using indication light emitting diodes 114 with differ colors and haptics from the haptic motor system 115, the smart ring system 100 can provide a seamless and intuitive user interaction paradigm that moves away from conventional touchscreen or button-based inputs. When rotating with the optical and capacitive touch sensors are engaged, the smart ring system 100 can cycle through the different applications available via the selected connected device(s) 600 and provide changing colors and haptic feedback to facilitate selection of a desired application.

In selected embodiments, the smart ring system 100 can initiate the application selection process by continuously processing output data provided by the IMU 112, the OFN 113 and/or other optical and/or capacitive touch sensor(s). By continuously processing the output data, the smart ring system 100 can recognize a single and/or double tap gesture against another surface. The smart ring system 100 thereby can initiate the application selection process via a single and/or double tap gesture, which could prove beneficial in selected scenarios. However, the use of the single and/or double tap gesture may not be limited to just initiating an application selection routine. The smart ring system 100 can employ the single and/or double tap gesture as a trigger for various other functions and modes. For example, a single and/or double tap can be used to wake the device from a low-power state or interface with another connected device(s) 600. More generally, the single and/or double tap gesture can serve as an intuitive and eyes-free way to provide input to the smart ring system 100.

Exemplary applications of the smart ring system 100 are illustrated in FIGS. 5A-B. Turning to FIG. 5A, the smart ring system 100 is shown as being configured interacted with a smart telephone device 610. Using the OFN 113 as an interaction sensor for swiping in two dimensions, for example, the smart ring system 100 can control music available via the smart telephone device 610 from a distance. As an example, swiping up and down on the OFN 113 can translate to volume up and down on the smart telephone device 610; while, swiping left and right on the smart telephone device 610 can translate to next and previous track of music.

The smart ring system 100 is shown as being configured interacted with a smart television 620 in FIG. 5B. Using the OFN 113 as an interaction sensor for swiping in two dimensions, for example, the smart ring system 100 can control selection of one or more squares 622 presented by the smart television 620 from a distance.

In the manner discussed above, the smart ring system 100 described herein overcomes the limitations faced by prior wearable devices through its innovative approach to application context-switching. Prior approaches to context switching with smart rings are limited to voice recognition technologies, capacitive touch and physical buttons. Voice recognition proved to be impractical in noisy environments or in contexts where privacy or discretion is required. Physical buttons, on the other hand, increase the hardware complexity and impinge on design manufacturability and user comfort. Furthermore, physical buttons likewise were limited in their capacity for programmatic versatility because they cannot be employed for both device interaction and application switching concurrently. Capacitive touch increased surface required for resolution to be acceptable take away from the form factor.

The smart ring system 100 addresses these issues and more by introducing a rotational gesture-based interaction mechanism in combination with optical and capacitive touch controls that does not rely on audible commands or physical button presses. Instead, the smart ring system 100 advantageously utilizes rotational motion gestures activated by optical and capacitive touch sensors embedded within the smart ring system 100. The smart ring system 100, in other words, incorporates a unique mechanism that allows users to change applications on connected devices 600 through a novel combination of motion rotational gestures, optical and capacitive touch inputs, haptic motors and color indications on the smart ring system 100. This approach allows for a more versatile and intuitive method of application context-switching while maintaining acceptable form factor for comfort and wearability.

Figure 8A:
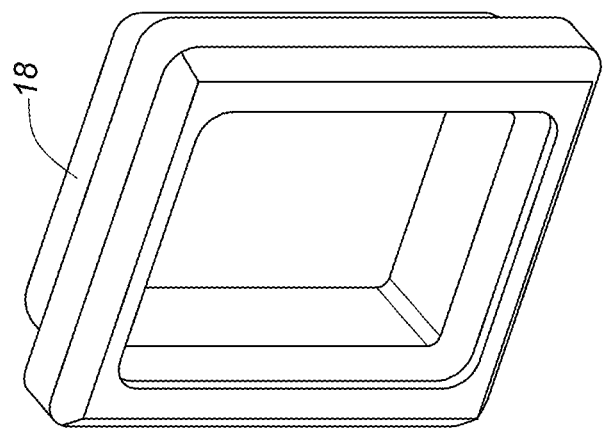
FIG. 8A is a detail drawing illustrating a conventional optical touch system with an optical lens system for touch, swipe and slide detections.

Turning to FIG. 8A, a conventional optical touch sensor system (or circuit) 10. The conventional optical touch system 10 is illustrated as comprising one or more infrared light emitting diodes (or LEDs) 14, an infrared sensor system (or circuit) 12, an optical lens system 16 and an optical cover 18. The optical lens system 16 and the optical cover 18 can have considerable height, which can increase a distance between capacitive sensor systems on a printed circuit board (or PCB) and/or an outer surface of a conventional smart ring device. The conventional optical touch system 10 can help solve resolution problems associated with capacitive touch systems disposed in limited areas. Such resolution problems can include a problem of false positive triggers. The optical touch sensor system 10 cannot determine the material of a surface that is being used to activate the optical touch sensor system 10. The optical touch sensor system 10, then, cannot distinguish between intended touches made by a finger (or thumb) 510 (shown in FIG. 3) of the user 500 (shown in FIG. 3) and unintended touches made by clothing of the user 500 and/or other non-conductive surfaces.

Figure 8B:
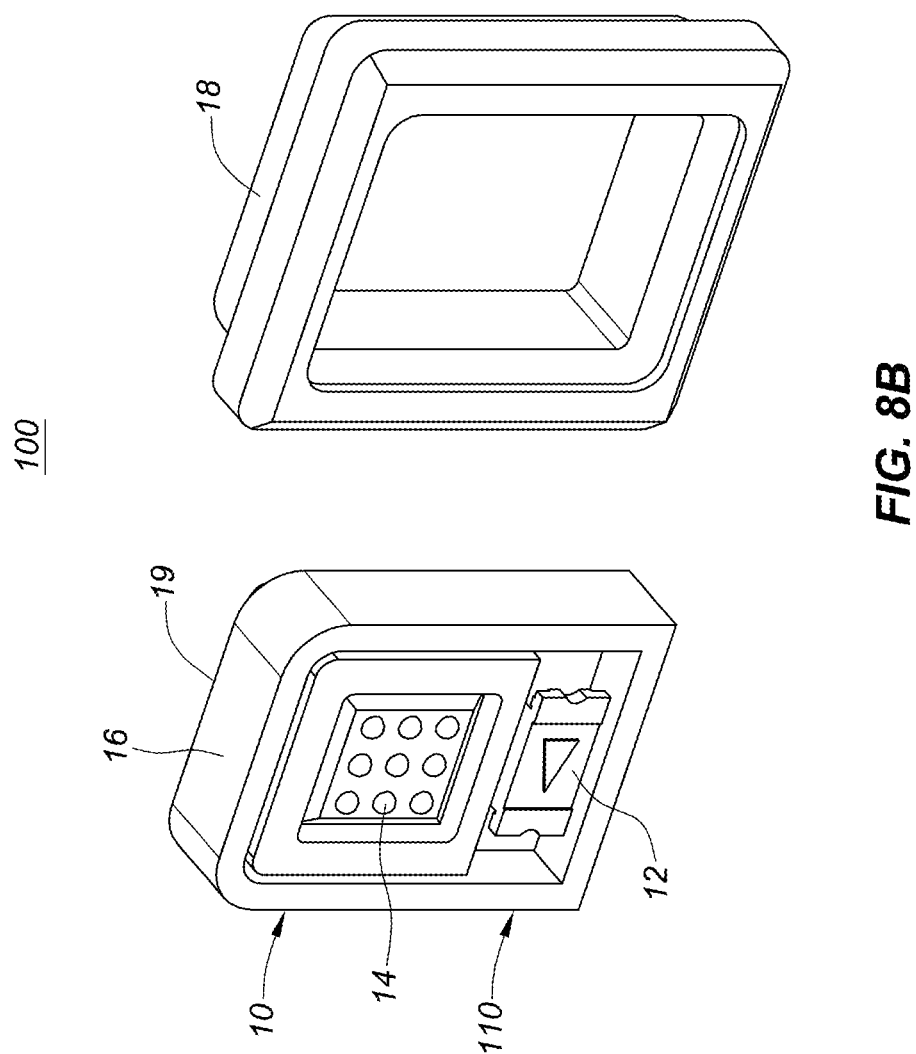
FIG. 8B is a detailed drawing illustrating an exemplary embodiment of a conductive material wall for being disposed about the optical lens system of the conventional optical touch system of FIG. 8A, wherein the conductive material wall can assist with false positive prevention.

The smart ring system 100 advantageously can address the resolution problems by introducing capacitive touch sensing in addition to optical touch sensing for preventing false positive triggers. As shown in FIG. 8B, for example, the smart ring system 100 can include a conductive material wall 19 that can be disposed around the optical lens system 16 of the conventional optical touch system 10 as shown on FIG. 8B. The conductive material wall 19 can help address the problem of false positive triggers. The conventional optical touch system 10 with the conductive material wall 19 can be soldered to a main PCB 120 (shown in FIG. 6A) to act as a capacitive touch sensor while also fitting under the optical cover 18. The conventional optical touch system 10 with the conductive material wall 19 advantageously can allow for a resolution provided by the optical sensor system and an ability to distinguish conductive surfaces provided by the capacitive touch system increasing functionality and reducing unintended touches.

Figure 6A:
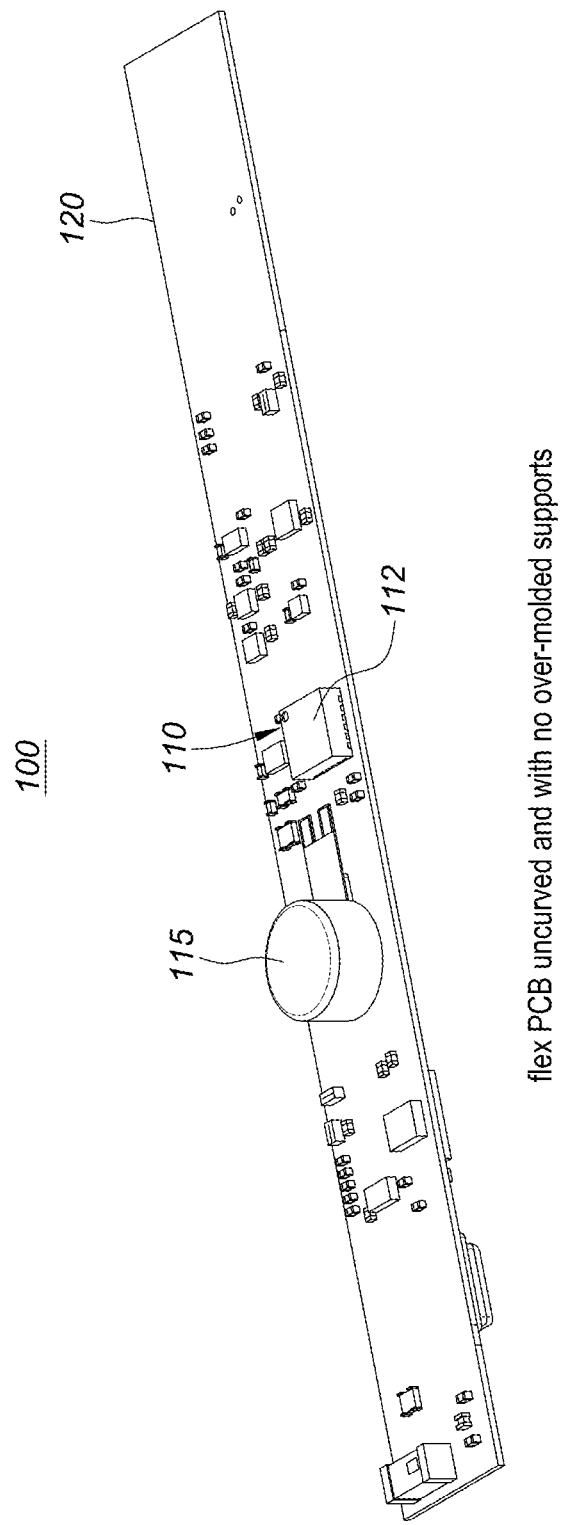
FIG. 6A is a detail drawing illustrating an exemplary alternative embodiment of the smart ring system of FIG. 1, wherein the wearable smart ring system comprises a plurality of electrical components disposed onto a flexible printed circuit board.

The smart ring system 100 can be assembled or otherwise manufactured in any suitable manner. In selected embodiment, the electrical components 110 of the smart ring system 100 can be disposed on one or more printed circuit boards (or PCBs) 120 as illustrated in FIG. 6A. At least one of the printed circuit boards 120 can comprise a flexible printed circuit board and/or flat flex printed circuit board. Each of the printed circuit boards 120 can comprise any predetermined number of layers 122 (shown in FIGS. 8A-B) of dielectric and/or conductive materials. One or more of the printed circuit boards 120, for example, can include one, two, four, six or eight layers 122, without limitation. Being shown in a flat state in FIG. 6A, the printed circuit boards 120 can host the electrical components 110, including, for example, the main control unit 111, the charger integrated circuit 117, the rectifier circuit 118 and/or and the charging coil 119, and any interface connectors (not shown). The electrical components 110 advantageously can be arranged on the printed circuit boards 120 to help ensure compactness and/or flexibility.

Figure 6B:
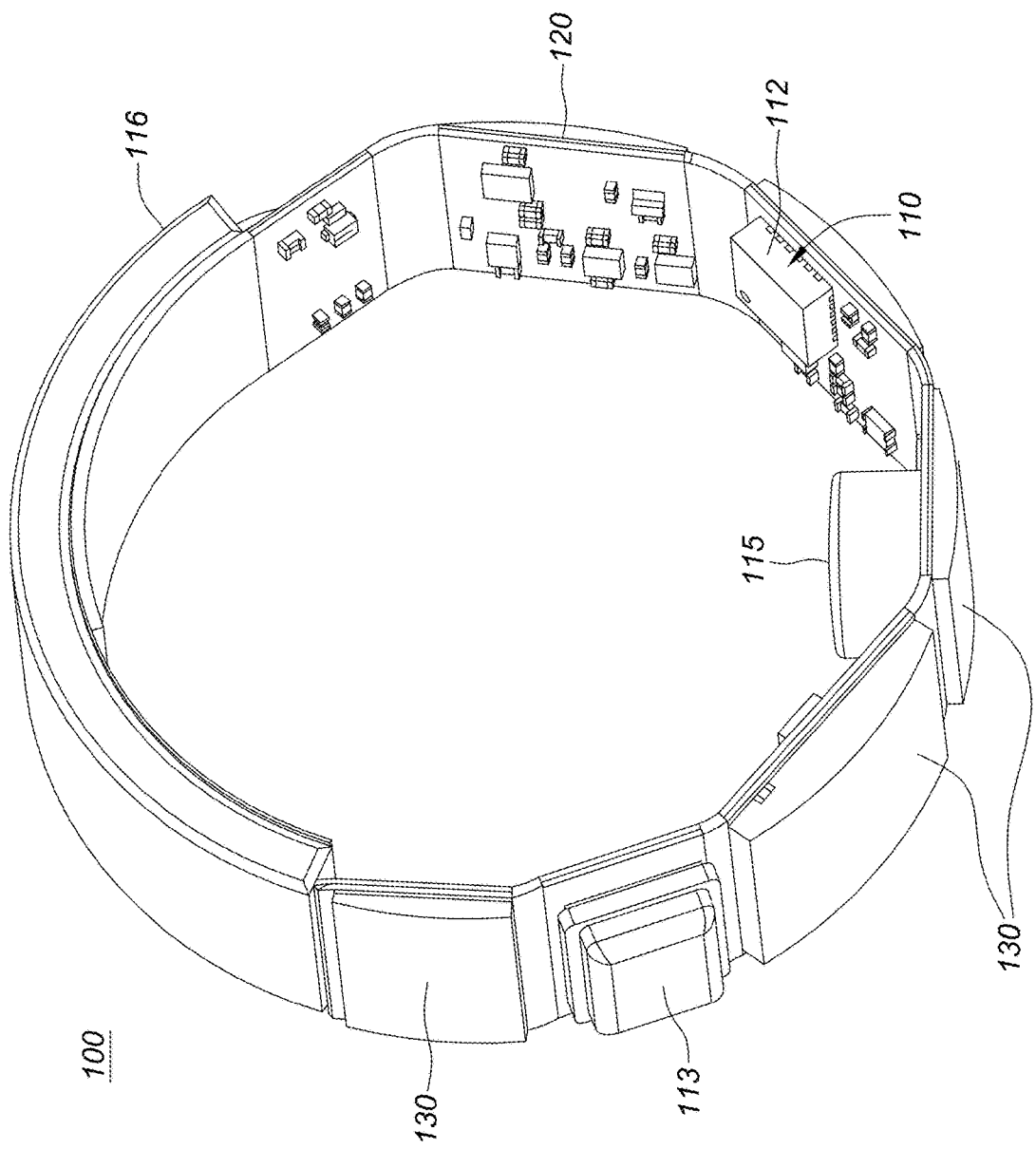
FIG. 6B is a detail drawing illustrating an exemplary alternative embodiment of the smart ring system of FIG. 6A, wherein the flexible printed circuit board is curved and overmolded to form an annulus.

The printed circuit boards 120 can be curved to form an annulus (or ring shape) as shown in FIG. 6B. Turning to FIG. 6B, one or more over-molded supports 130 can be incorporated into the smart ring system 100 for providing rigidity on sections of the printed circuit boards 120 that cannot be bent due to a presence of at least one of the electrical component 110. The over-molded supports 130 can help prevent curvature at predetermined areas of the printed circuit board 120 while allowing electrical components 110 to be placed on a top layer 122A (shown in FIGS. 8A-B) and/or a bottom layer 122N (shown in FIGS. 8A-B) of the printed circuit board 120. In selected embodiments, the over-molded supports 130 advantageously can provide structural integrity while allowing an ergonomic form factor, for example, when the smart ring system 100 includes a single flexible printed circuit board 120. Stated somewhat differently, the over-molded supports 130 can help transform a flex printed circuit board into a rigid-flex printed circuit board.

Use of the over-molded supports 130 can help overcome a minimum length requirement for the flex sections of a rigid-flex printed circuit boards 120, which requirement can render such a design impossible with traditional rigid-flex methods. A flex printed circuit board thereby can be converted into a rigid-flex printed circuit board without the minimum five-millimeter length constraint on the flex sections of the rigid-flex printed circuit board. The electrical components 110 can be disposed on the printed circuit board 120 without compromising a structural integrity the printed circuit board 120 in later stages of the manufacturing process. Use of the printed circuit board 120 likewise can avoid adversely affecting a thickness and/or a size of the smart ring system 100 and/or without compromising functionality of the smart ring system 100. The manufacturing process, for example, can permit the electrical components 110 for the application selection mechanism shown and described above with reference to FIGS. 3 and 4 to fit in a suitable form factor for size, comfort and wearability of the smart ring system 100.

Figure 7A:
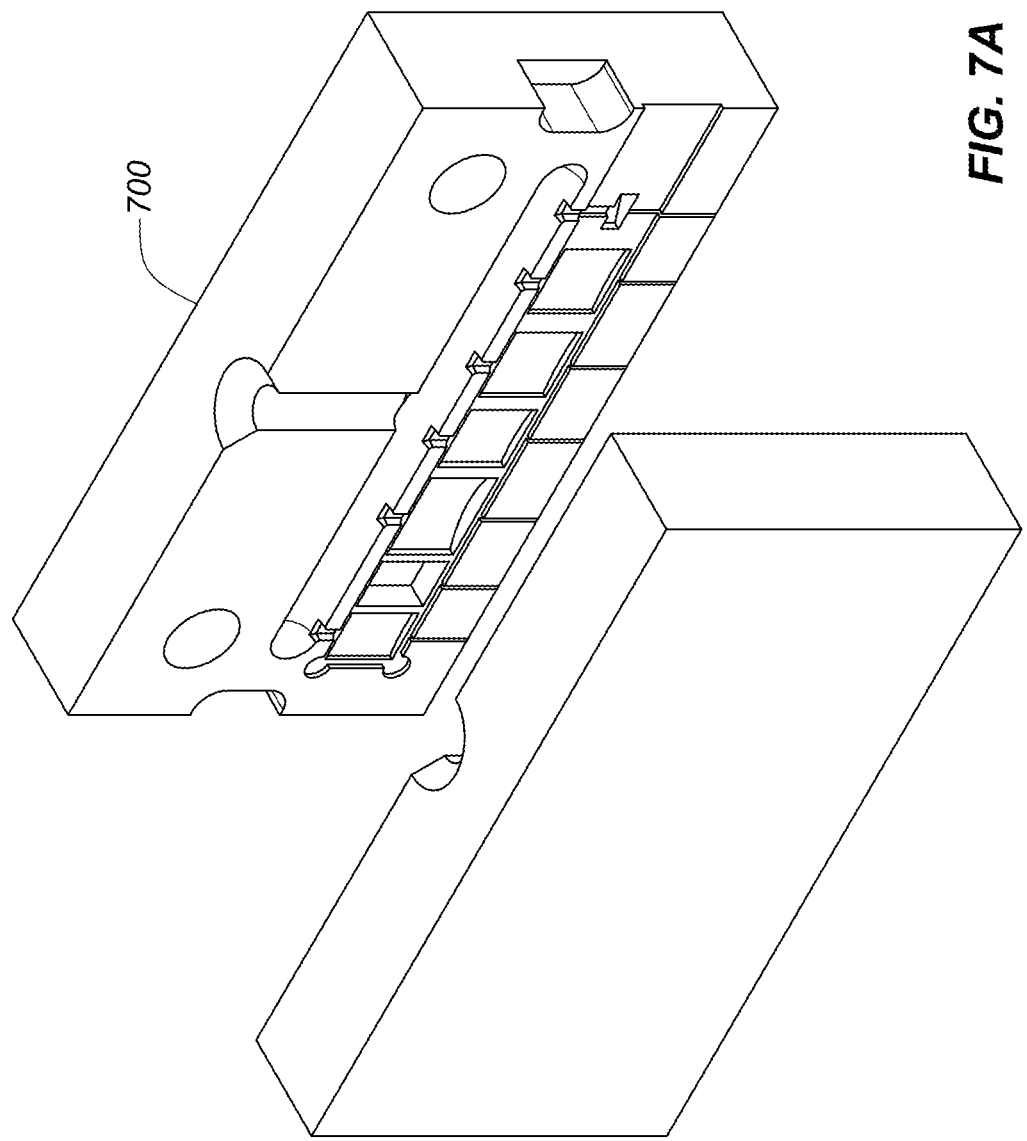
FIG. 7A is a detail drawing illustrating an exemplary embodiment of a mold for overmolding the flexible printed circuit board of the smart ring system of FIGS. 6A-B.
Figure 7B:
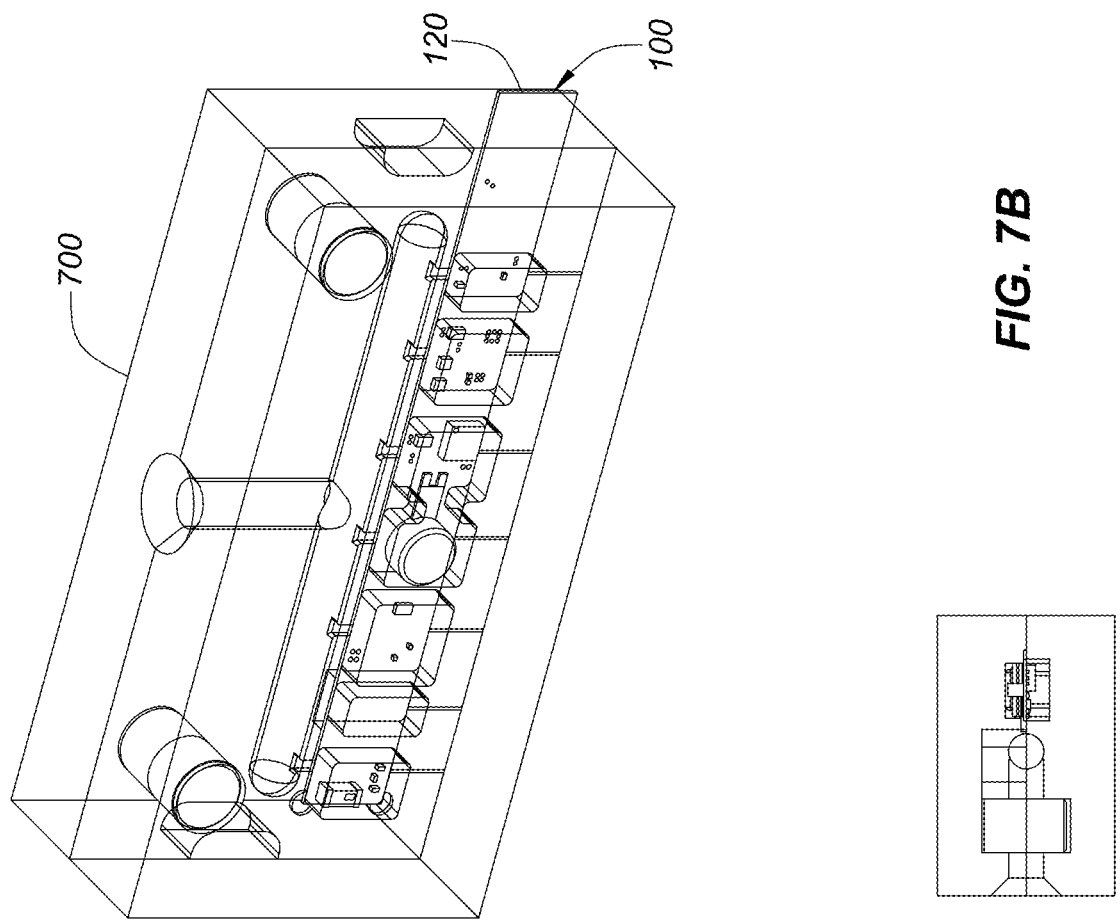
FIG. 7B is a detail drawing illustrating several views of the exemplary mold of FIG. 7A, wherein the flexible printed circuit board of the smart ring system is disposed in the mold.
Figure 7B:
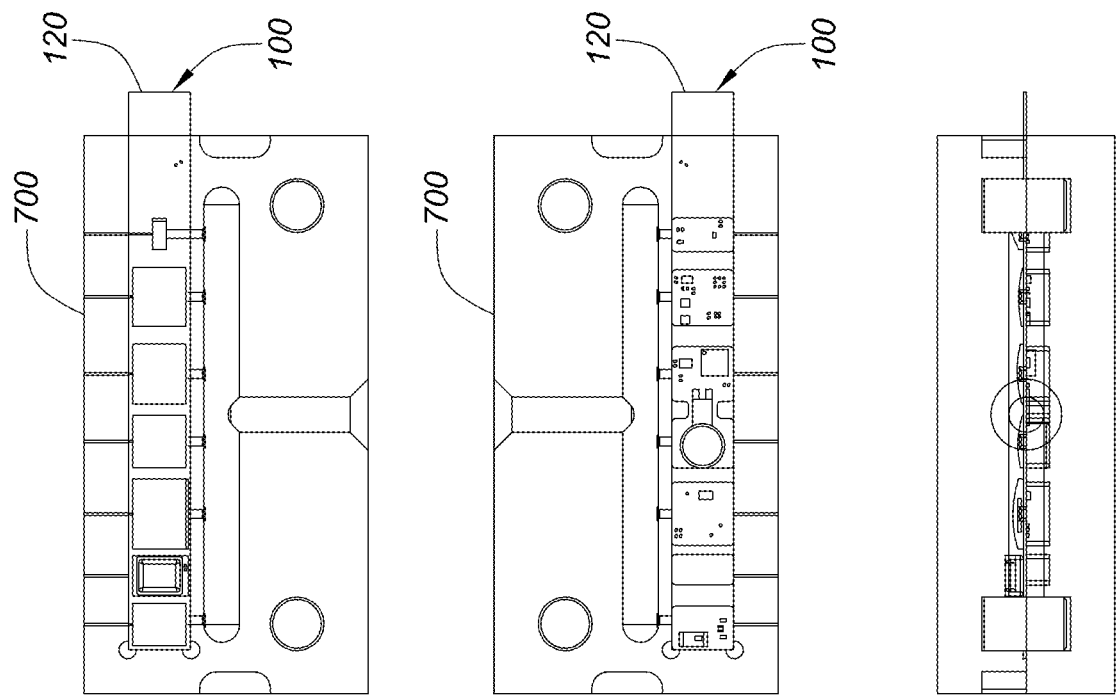

FIGS. 7A-B show an exemplary mold 700 for overmolding the flexible printed circuit board 120 of the smart ring system 100. In selected embodiments, the electrical components 110 can be disposed on one side (or both sides) of the flexible printed circuit board 120. As shown in FIG. 7A, for example, the mold 700 can comprise a two-part mold. By overmolding the flexible printed circuit board 120, the flexible printed circuit board 120 can be converted into a rigid-flex printed circuit board that can be configured to bend but without bending the sections of the flexible printed circuit board 120 that contain the electrical components 110. The rigid-flex printed circuit board 120 likewise can overcome the minimum length requirement for flex sections in traditional rigid-flex printed circuit boards.

Figure 9A:
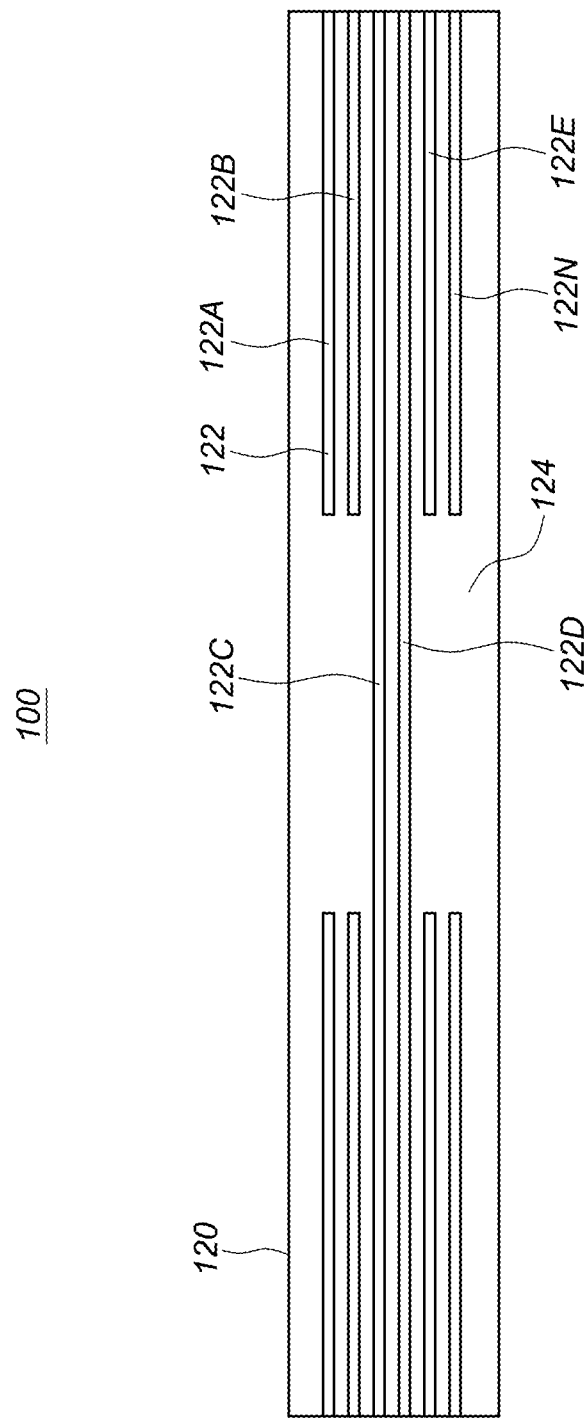
FIG. 9A is a detailed drawing illustrating another exemplary embodiment of the flexible printed circuit board of FIGS. 6A-B.
Figure 9B:
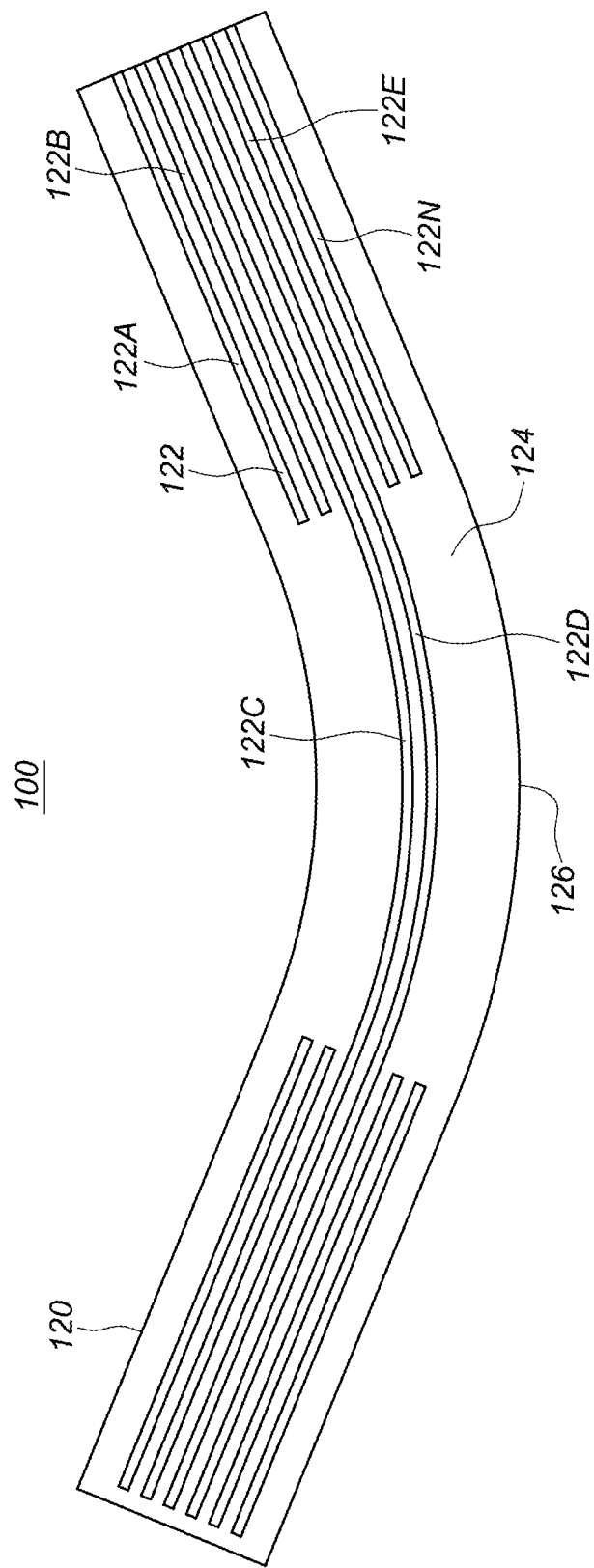
FIG. 9B is a detailed drawing illustrating an exemplary alternative embodiment of the flexible printed circuit board of FIG. 9A, wherein the flexible printed circuit board is disposed in a curved state.

In the manner discuss in more detail above with reference to FIGS. 6A-B, the rigid-flex printed circuit board 120 can have a minimum length requirement. The rigid-flex printed circuit board 120, in selected embodiments, likewise can have a minimum bend radius requirement. The minimum bend radius requirement can help to avoid strain and tears on the printed circuits within the rigid-flex printed circuit board 120 when the rigid-flex printed circuit board 120 is bent. Turning to FIGS. 9A-B, the minimum bend radius requirement can be overcome by noticing that tension and compression forces acting on the circuits when the rigid-flex printed circuit board 120 is bent can occur toward the top layer 122A and/or the bottom layer 122N of the rigid-flex printed circuit board 120, respectively, while the circuits in the center layers 122B-E of the rigid-flex printed circuit board 120 can remain unaffected by the compression forces. As shown in FIGS. 9A-B, a layout of the rigid-flex printed circuit board 120 can be designed such that only one or more center layers, such as layers 122C, 122D, of the rigid-flex printed circuit board 120 are populated with circuits; while, the top and bottom layer 122A, 122N can comprise only substrate and no circuits. When the rigid-flex printed circuit board 120 is bent, the tension and compression forces thereby can act on the substrate-only areas, leaving the functional integrity of the rigid-flex printed circuit board 120 intact.

FIGS. 9A-B show a cross-section of an exemplary rigid-flex printed circuit board 120, wherein only the center layers 122C, 122D are used to populate circuits. As shown in the FIGS. 9A-B, the rigid-flex printed circuit board 120 can comprise six layers 122; while, only populating the center layers 122C, 122D in the area(s) 124 where a bend is expected. Turning to FIG. 9A, the rigid-flex printed circuit board 120 is shown in a flat state, wherein no tension or compression forces are exerted on the rigid-flex printed circuit board 120. Turning to FIG. 9B, the rigid-flex printed circuit board 120 is illustrated in a curved state, wherein one or more tension forces (not shown) can affect the top layers 122A of a curved area 126 of the rigid-flex printed circuit board 120; while, compression forces (not shown) can affect the bottom layers 122N of the curved area 126. No tension or compression forces preferably affect the center layers 122C, 122D, allowing for populated circuits while maintaining functionality thus overcoming the minimum bend radius requirement for the rigid-flex printed circuit board 120.

Once manufactured and assembled in a flat state, the flexible printed circuit board 120 can be disposed within the mold 700 as depicted in FIG. 7B to get over-molded. The flexible printed circuit board 120 can be over-molded with supports and then curved and loaded into a device enclosure (not shown) for any subsequent manufacturing steps. The disclosed manufacturing technique thereby can allow the flexible printed circuit board 120 can be converted into a rigid-flex printed circuit board without the length constraint, allowing for more functionality in a smaller housing, and supporting methods for changing applications with a combination of rotational gestures and optical and capacitive touch controls from a smart ring system 100 that may not have traditional touch screens or physical buttons.

The smart ring system 100 and related manufacturing methodology can support a greater density of electronic components on a wearable device, which can be advantageous in maintaining a slim profile without compromising the structural integrity or functionality of the smart ring system 100 during and after the final manufacturing processes. The manufacturing methodology, in other words, allows for a thinner, and more compact, smart ring system 100 while increasing component number and functionality. Accordingly, the smart ring system 100 and related manufacturing methodology constitute a considerable improvement over previous solutions. They offer a smart ring system 100 that not only is functionally better and easier to operate, but also adheres to the stringent design and comfort requirements expected of modern wearable technology.

Those skilled in the art will realize that the above recognized advantages and other advantages described herein are merely exemplary and are not meant to be a complete rendering of all of the advantages of the various embodiments set forth in the present disclosure.

Each system (or circuit), as described in the present disclosure or any of its components, may be embodied in the form of a processing device (or circuit). The processing device can be, for example, but is not limited to, a general-purpose computer, a smartphone, a programmed microprocessor, a micro-controller, a peripheral integrated circuit element, and other devices or arrangements of devices, which are capable of implementing the steps that constitute the method disclosed herein. The processing device can include a processor, a memory, a non-volatile data storage, a display and/or a user interface.

In selected embodiments, one or more of the features disclosed herein can be provided as a computer program product being encoded on one or more non-transitory machine-readable storage media. As used herein, a phrase in the form of at least one of A, B, C and D herein is to be construed as meaning one or more of A, one or more of B, one or more of C and/or one or more of D. Likewise, a phrase in the form of A, B, C or D as used herein is to be construed as meaning A or B or C or D. For example, a phrase in the form of A, B, C or a combination thereof is to be construed as meaning A or B or C or any combination of A, B and/or C.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A wearable annular device for enabling a wearer to control operation of one or more smart devices, comprising:
   a main control circuit being disposed on a first printed circuit board region of a printed circuit board and being configured to receive at least one of a detected gesture, optical input and capacitive-based touch input via the printed circuit board and to convert the received gesture, optical input and capacitive-based touch input into control instruction for controlling a predetermined smart device; and an energy transmitting circuit being disposed on a second printed circuit board region of the printed circuit board and being configured to receive a control instruction via the printed circuit board and wirelessly transmitting the received control instruction to the predetermined smart device, wherein said main control circuit receives quaternion orientation data or Euler angle orientation data associated with an angle of rotation of a hand of a wearer and converts the detected quaternion orientation data or Euler angle orientation data into a first control instruction for activating a first application of the predetermined smart device when the detected quaternion orientation data or Euler angle orientation data indicates that the angle of rotation of the hand of the wearer is oriented in a first range of rotational angles or second control instruction for activating a second application of the predetermined smart device when the detected quaternion orientation data or Euler angle orientation data indicates that the angle of rotation of the hand of the wearer is oriented in a second range of rotational angles.

2. The wearable annular device of claim 1, wherein the control instruction activates the predetermined smart device or activates an application associated with the predetermined smart device.

3. The wearable annular device of claim 1, wherein the wearable annular device comprises a wearable ring system.

4. A rigid-flex printed circuit board, comprising:
a plurality of printed circuit board regions including one or more flexible printed circuit board regions being disposed between respective adjacent printed circuit board regions; and
an over-molded support being disposed adjacent to a predetermined outer layer associated with a predetermined flexible printed circuit board region of the printed circuit board and being configured to inhibit curvature of the predetermined flexible printed circuit board region while permitting one or more electrical components to be placed on the predetermined outer layer,
wherein the flexible printed circuit board regions are bent such that the printed circuit board forms an annulus that defines an opening for receiving a portion of a body of a wearer.

5. The rigid-flex printed circuit board of claim 4, wherein at least two of said printed circuit board regions of the printed circuit board comprise the same printed circuit board region.

6. The rigid-flex printed circuit board of claim 4, wherein the printed circuit board comprises a printed circuit board with multiple circuit layers that include a pair of inner layers disposed within a pair of outer layers, wherein the pair of outer layers associated with the flexible printed circuit board regions include no circuits.

7. The rigid-flex printed circuit board of claim 4, wherein each of the one or more flexible printed circuit board regions of the printed circuit board has a length that is less than five millimeters.

8. The rigid-flex printed circuit board of claim 6, wherein the annulus defines the opening for receiving a finger of a hand of the wearer.

9. A wearable device with combined optical touch and capacitive touch sensing, comprising:
an optical touch circuit being disposed on a first printed circuit board region of a printed circuit board and being configured for detecting optical input from a wearer; and
a capacitive touch circuit being disposed on a second printed circuit board region of the printed circuit board and being configured for detecting a capacitive-based touch input from the wearer,
wherein the printed circuit board forms an annulus that defines an opening for receiving a portion of a body of the wearer.

10. The wearable device of claim 9, further comprising a wall being formed from a conductive material, being connected to said capacitive circuit and being disposed around said optical touch circuit for preventing false positive triggers in the detected optical input.

11. The wearable device of claim 9, further comprising an indication circuit being disposed on a third printed circuit board region of the printed circuit board and being configured to communicate with a main control circuit via the printed circuit board for presenting feedback to the wearer.

12. The wearable device of claim 11, wherein said indication circuit comprises at least one light emitting diode for presenting visual feedback to the wearer.

13. The wearable device of claim 11, wherein said indication circuit comprises a haptic motor circuit for presenting haptic feedback to the wearer.

14. The wearable device of claim 9, further comprising an energy transmitting circuit being disposed on a third printed circuit board region of the printed circuit board and being configured to receive a control instruction via the printed circuit board and wirelessly transmitting the received control instruction to a predetermined smart device.

15. The wearable device of claim 14, wherein said energy transmitting circuit includes a charging coil.

16. The wearable device of claim 9, further comprising an inertial measurement circuit being disposed on a third printed circuit board region of the printed circuit board and being configured for detecting a rotational motion gesture made by the wearer.

17. The wearable device of claim 16, wherein said inertial measurement circuit comprises at least one accelerometer circuit.

18. The wearable device of claim 16, wherein said inertial measurement circuit comprises at least one gyroscope circuit.

19. The wearable device of claim 16, wherein said inertial measurement circuit comprises at least one magnetometer circuit.

20. The wearable device of claim 9, wherein the first and second printed circuit board regions comprise the same printed circuit board region.

21. The wearable device of claim 9, wherein the wearable device comprises a wearable ring device.

* * * * *